Figure 4:
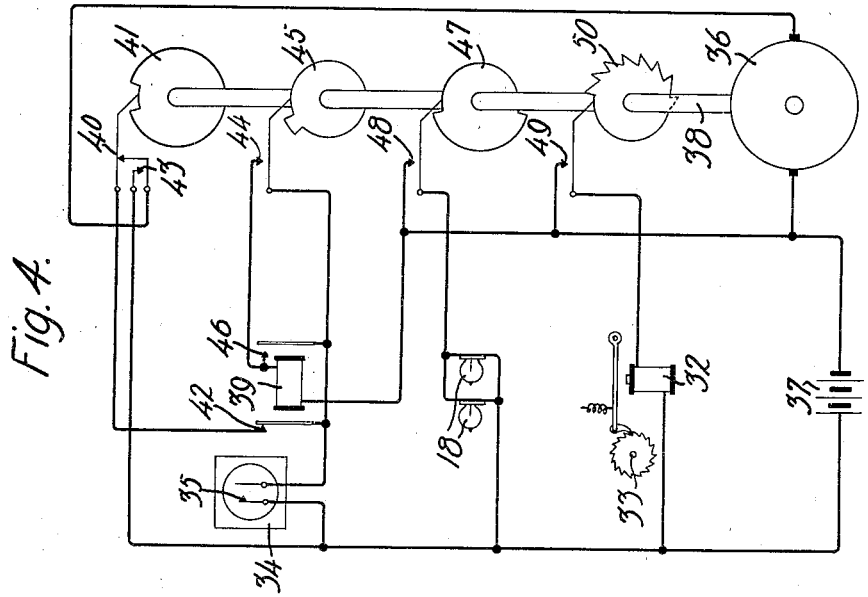

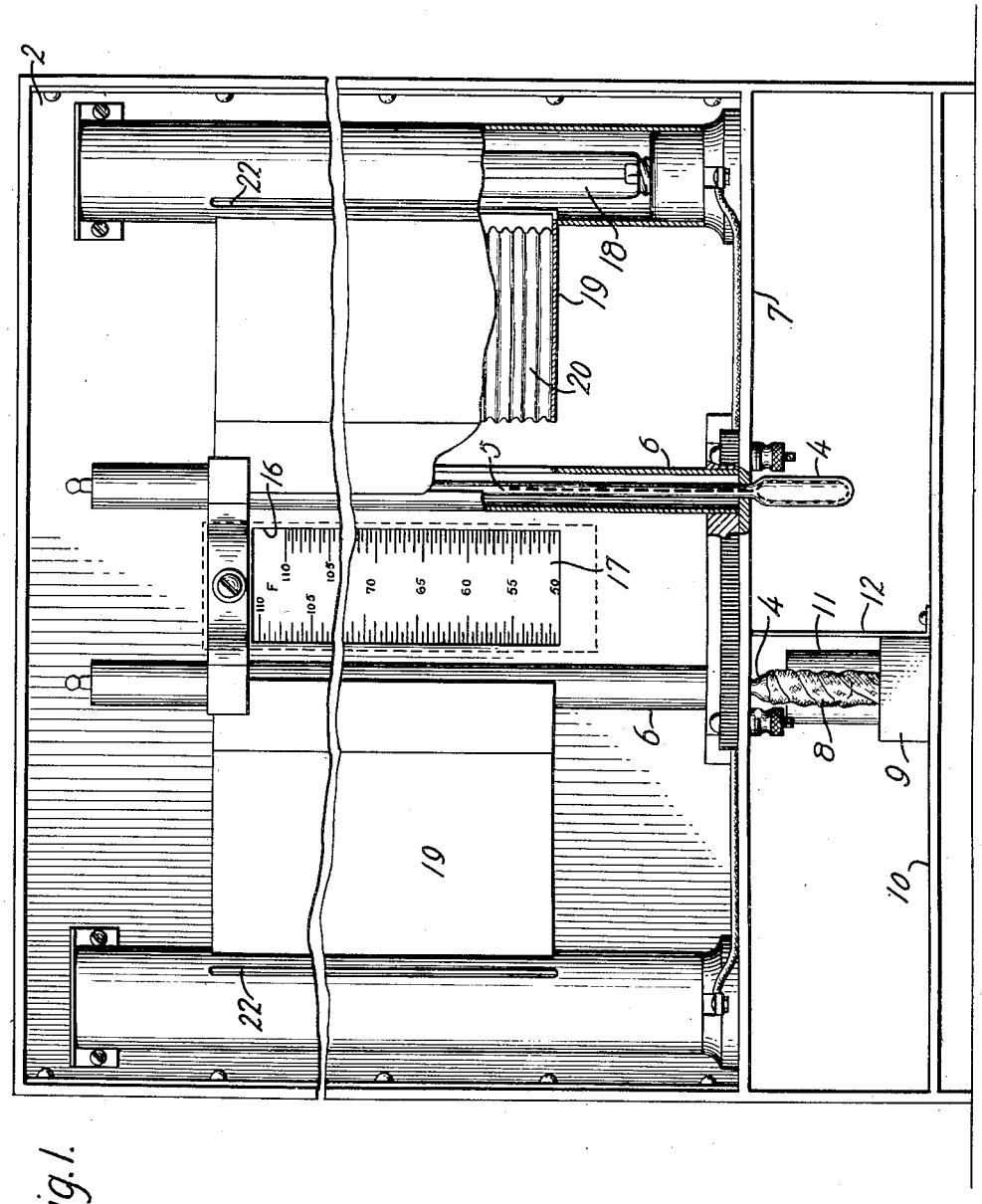

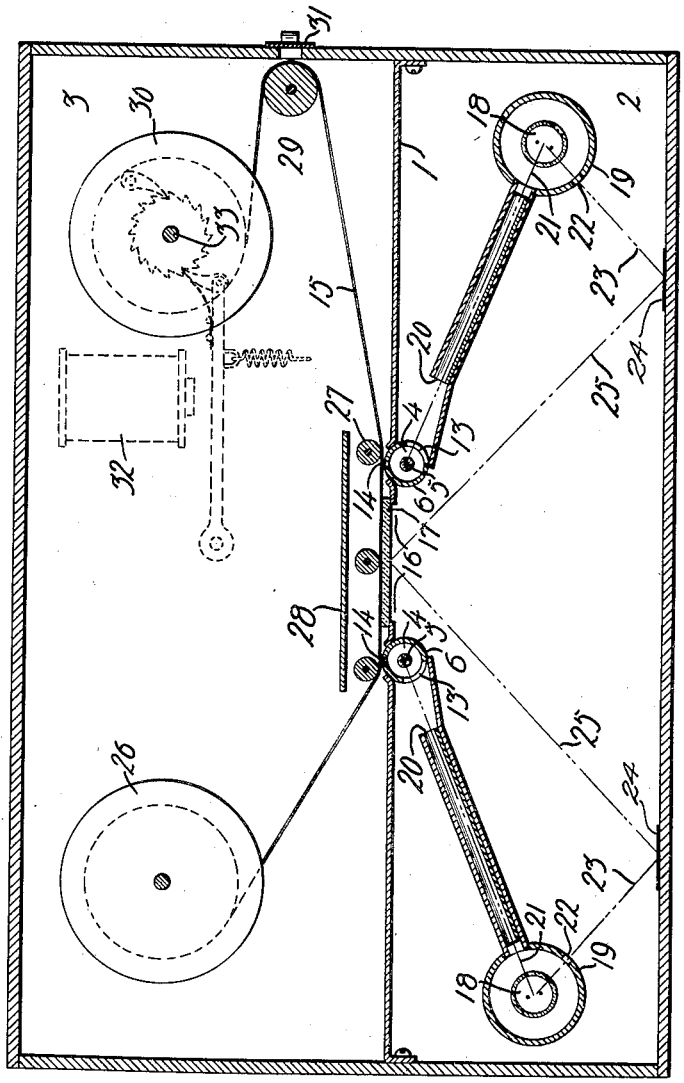

Sept. 2, 1924.  
D. T. MAY  
APPARATUS FOR AND METHOD OF RECORDING THE TEMPERATURE AND HUMIDITY OF THE ATMOSPHERE  
Filed July 9, 1921      3 Sheets-Sheet 3

1,506,764

Inventor:
David T. May
by Joel C. ? Palmer
Att'y.

Patented Sept. 2, 1924.

1,506,764

UNITED STATES PATENT OFFICE.

DAVID T. MAY, OF NEW YORK, N. Y., ASSIGNOR TO WESTERN ELECTRIC COMPANY, INCORPORATED, OF NEW YORK, N. Y., A CORPORATION OF NEW YORK.

APPARATUS FOR AND METHOD OF RECORDING THE TEMPERATURE AND HUMIDITY OF THE ATMOSPHERE.

Application filed July 9, 1921. Serial No. 483,393.

*To all whom it may concern:*

Be it known that I, DAVID T. MAY, a citizen of the United States, residing at New York, in the county of New York, State of New York, have invented certain new and useful Improvements in Apparatus for and Methods of Recording the Temperature and Humidity of the Atmosphere, of which the following is a full, clear, concise, and exact description.

This invention relates to recording apparatus, and particularly to apparatus for and methods of recording atmospheric temperature and humidity conditions.

It is an object of this invention to provide means for and methods of permanently and accurately producing an automatic record of atmospheric temperature and humidity with a minimum amount of personal attention.

In accordance with this object the invention contemplates obtaining a permanent photographic record of humidity conditions by printing an image of thermometer column heights and a stencil scale of degrees on a photographically sensitive surface. The record consists of images of the tops of the indicating columns of a dry and a wet bulb thermometer arranged alongside of a transparent screen provided on its edges with two scales, each identical with the calibration of the respective adjacent thermometer. In this way there are practically eliminated all inaccuracies except those which may exist in the thermometer calibrations. The operation of the apparatus is largely automatic, the only attention required being such routine duties as maintaining a supply of water for the wet bulb, winding a clockwork mechanism, and renewing the record chart at fairly infrequent intervals. In accordance with the invention, in forming the image of the top of the indicating columns, no lenses are employed, the light rays being passed through the thermometer tube in such a manner as to be intercepted in that part of the tube occupied by the liquid and pass through that part of the tube above the liquid. A sensitized paper placed adjacent to the tube and on the side opposite to the entrance of the rays will therefore show an image of that part of the tube through which the rays pass and the lower end of this image will be the top of the indicating column which indicates the temperature. The instrument consists of two light tight chambers, the front or projection chamber containing the thermometers suitably shielded and the sources of light with their protecting masks, and the rear chamber containing the recording chart with its reels and the means for properly locating the position of the chart. These two chambers are separated by a partition, light tight except for openings through which it is desired to pass the light rays to the chart. The thermometers extend through the bottom of the front chamber, the bulb of one being covered with a wick which extends into a water receptacle carried on a shelf below. Another shelf carries the motor which serves for advancing the chart. The control mechanism is a separate self-contained unit and can be mounted in any convenient location and connected by leads to the instrument.

The invention will be better understood from a consideration of the following description taken in connection with the accompanying drawings and the appended claims.

Figure 3:
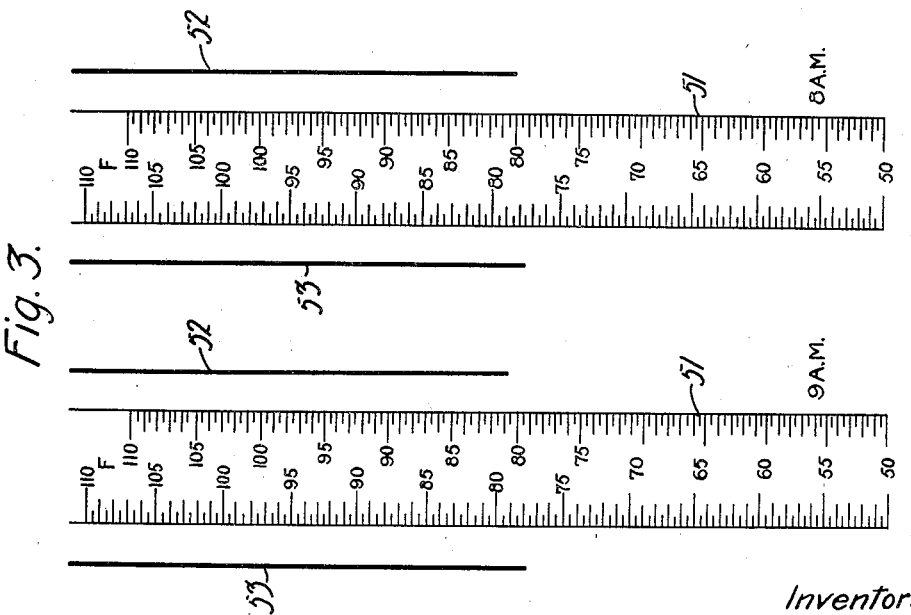

In the drawings, Fig. 1 is a front view, part in plan and part in section of the apparatus with the cover removed; Fig. 2 is a top sectional view of the apparatus in its preferred form; Fig. 3 is a section of the record chart showing the readings taken at two different times; and Fig. 4 shows the control circuit.

Referring to the drawings, 1 represents the partition separating the chambers 2 and 3. Each thermometer 4 having the bore 5 and surrounded by a metal shielding tube 6 is mounted in front of the partition 1, the metal tube being attached to the partition by a light tight joint. The thermometers extend through the bottom 7 of the front chamber 2, the bulb of one being covered with a wick 8 which extends into a water receptacle 9 carried below on a shelf 10. The inverted vessel 11, resting in the tank 9, serves to maintain a constant water level. Between the thermometers is placed a baffle plate 12 which prevents the dry bulb being affected by the nearby wet wick. Each tube 6 is provided with two openings extending longitudinally over the portion of the thermometer which it is desired to record. The opening 13 covers about 90° of the circumference of the tube 6; and opening 14 is a slit of a width about equal to the diameter of the bore 5. The partition 1 is provided with openings similar to and coinciding with the slits 14 and on the opposite side of the partition passes the photographic chart 15. The partition is also provided with an opening 16 before which is attached a transparent screen 17 provided on its edges with two scales each identical to the calibration of the respective adjacent thermometer. At angles of 22½° with the partition are located the sources of light 18 each having a shield 19 which surrounds the lamp and projects in toward the thermometer, thus providing approximately parallel rays transversely of the thermometer.

In determining the angle of the sources of light 18 with the partition 1, it was found that if the light rays are passed through the thermometer tube at right angles to the plane of the recording chart, no indication of the height of the indicating column can be obtained. The reason for this is that the rays passing through the walls of the thermometer tube are so refracted as to be largely focused at the slit 14 in the mask adjacent the chart while those passing through the bore of the tube are differently refracted, only a part of them reaching the chart. The result is a dense line extending the entire length of the tube sufficient to obscure any difference which may have existed due to the rays passing through the filled and empty parts of the bore. It is therefore necessary to cause the rays from the sources of light to enter at an acute angle with respect to the photographic chart, in this way shifting the converging rays through the two walls to a point within the mask but at the same time allowing the rays through the bore to pass through the slit in the mask. When an angle of 45° is used for the entering rays, a well-defined image of the bore above the indicating column may be obtained. It has been found, however, that an angle of 22½° is best suited to this purpose.

In order that a well-defined image may be obtained, it is also necessary that only approximately parallel rays of light be obtained longitudinally and this is accomplished by employing the apparatus which forms the subject matter of C. H. Wheeler application, Patent No. 1,434,862, filed Nov. 7, 1922, by placing within the parallel sides of the inwardly projecting portion of the shields 19 a strip of corrugated sheet metal as shown at 20. The light for recording the height of the indicating column passes along line 21 and thence through the openings to the chart. Light for recording the scales passes through the opening 22 in the shield 19 along the line 23 to a suitable reflecting surface 24 on the inside wall of the chamber 2 and thence is reflected along the line 25 to the screen 17. In the rear chamber 3 the chart 15 passes from the spool 26 over the rollers 27 which are supported by the member 28 and which serve to keep the chart flat against the partition, over the roller 29 to the spool 30 which is carried on the shaft of a stepping motor. The passage of the chart 15 around the roller 29 is for the purpose of permitting a view of the chart at the time of installation. Each end of the chart may be provided with a length of black paper to permit loading in daylight and by means of a window 31, preferably of the spring shutter type, in the side of the chamber 3, it can be determined when the chart has been advanced to the proper position.

The stepping motor 32 may consist of any suitable electromagnetically operated mechanism such as the pawl and ratchet device shown in the drawing. This motor drives a shaft 33 provided with the necessary bearings and passing to the interior of the rear chamber 3 where it carries the winding spool 30.

The control apparatus, more clearly shown in Fig. 4, consists of a clock 34 equipped with a contact 35, a battery motor 36 run by batteries 37, a cam shaft 38 equipped with four cams of insulating material, and a relay 39 used in limiting the cam shaft to one revolution per closure of the clock contact. The operation of the device is as follows: The closure of the clock contact 35 closes the motor circuit through the contact 40 of cam 41, the back contact 42 of the relay 39, and the clock contact. As the shaft 38 rotates, cam 41 closes the contact 43 and opens 40 and the motor continues to operate through contact 43 alone. The rotation of the shaft 38 then closes contact 44 of cam 45, which serves to operate the relay 39 which locks up through its front contact 46 and the clock contact. Upon the completion of one revolution, cam 41 opens contact 43 and closes 40 and the motor stops due to its circuit being open at contact 42, the relay remaining locked up until at any time subsequent to the completion of one revolution of the cam shaft, the clock contact is opened. The circuit is thus restored to normal and remains so until the next closure of the clock contact. During the revolution of the shaft 38, cam 47 operates the lamps 18, through the contact 48, for the proper period, causing a photograph of the calibrated screen 17 and the thermometer bores 5 to be made on the chart 15, as described above. Immediately after this operation the contact 49, controlled by the toothed cam 50, operates the stepping motor 32 to advance the chart 15 to a new position ready to take the next reading.

It will be obvious that the clock contact may be so arranged that a reading may be taken at any time. Fig. 3 shows, for example, two records taken at 8 a. m. and 9 a. m., respectively. The photograph of the calibrated screen 17 is represented at 51, while the prints of the bores of the dry and wet thermometers are shown, respectively, at 52 and 53. By comparing the readings of the dry and wet thermometers recorded simultaneously, the relative humidity may readily be computed from standard psychrometric tables published by the United States Weather Bureau.

In addition to the equipment described it may be found convenient to employ a fan of some kind to keep the air in circulation around the thermometer bulbs. An ordinary electric fan will serve this purpose and may be located at some distance and in such a manner that the blast is directed at the bulbs. In making portable apparatus of the type described it will probably be found desirable to employ a small fan of the exhaust type permanently attached to the instrument and communicating with the bulbs by means of a tube. The fan may either be operated permanently or through additional clock contacts arranged to close somewhat before the contact controlling the recording elements.

What is claimed is:

1. The method of recording temperature which comprises directing light rays upon a thermometer tube to form an image on a light-sensitive chart of that portion of the tube through which the rays pass, and simultaneously forming adjacent said image an image of a scale corresponding to the calibration of said thermometer.

2. The method of recording temperature and humidity conditions which comprises directing rays from a source of light upon dry and wet bulb thermometer tubes to form an image on a light-sensitive chart of the portions of the tubes through which the rays pass, and simultaneously forming adjacent said image an image of scales corresponding to the calibrations of the respective thermometers.

3. In a recording device, an index, a scale independent of said index, a light-sensitive chart disposed on one side of said index, a source of light disposed on the opposite side of said index, means for forming an image of said scale upon said chart, means for directing rays of light from said source upon said index, and means for forming adjacent the image of said scale an image of that portion of the index through which the light rays pass.

4. In a recording device, an index, a transparent screen containing a scale, a light-sensitive chart disposed on one side of said index, a source of light disposed on the opposite side of said index, and means for directing rays of light from said source upon said index and upon said screen for independently photographing said index and said scale upon said chart.

5. In a recording device, an index, a scale independent thereof, a light-sensitive chart disposed on one side of said index, a source of light disposed on the opposite side of said index, a timing device, means controlled by said timing device for energizing said source of light to record independent images of said index and said scale on said chart, and means controlled by said timing device for moving said chart after each such recording operation.

6. In a recording device, an index, a transparent screen containing a scale, a light-sensitive chart disposed on one side of said index, a source of light disposed on the opposite side of said index, a timing device, means controlled by said timing device for energizing said source of light to record independent images of said index and said scale on said chart, and step-by-step means controlled by said timing device for advancing said chart after each such recording operation.

7. In a device for recording temperature, a thermometer, a scale corresponding to the calibration of said thermometer and independent thereof, a light-sensitive chart disposed on one side of said thermometer, a source of light disposed on the opposite side of said thermometer at an acute angle with said chart, means for photographing said scale upon said chart, means for directing rays from said source of light upon the indicating column of said thermometer, and means for forming adjacent the image of said scale an image of that portion of the indicating column of the thermometer above the liquid.

8. In a device for recording temperature and humidity conditions, wet and dry bulb thermometers, a transparent screen provided with scales corresponding to the calibrations of the respective thermometers and adjacent thereto, a light-sensitive chart disposed on one side of said thermometers, sources of light disposed on the opposite side of said thermometers at an angle of approximately $22\frac{1}{2}°$ with said chart, means for forming an image of said scales upon said chart, means associated with said sources of light for directing rays upon said thermometers, and means for forming adjacent the image of said scales an image of the portions of the indicating columns of the thermometers above the liquid.

9. In a temperature recording device, a light tight chamber, a partition dividing said chamber, a transparent screen disposed in said partition, a scale marked off on said screen, a light-sensitive chart disposed on one side of said screen, a thermometer corresponding to the calibration of said scale disposed on the opposite side of said screen, a source of light disposed at an angle of appromimately 22½° with said chart and adapted to form an image of said scale upon said chart, a shielding member associated with said source of light whereby rays therefrom are directed upon said thermometer, means for forming adjacent the image of said scale an image of that part of the indicating column of the thermometer above the liquid, and automatic means for periodically illuminating said thermometer and moving said chart whereby a series of images is recorded.

10. In a device for recording temperature and humidity conditions, a light tight chamber, a partition dividing said chamber, an opening in said partition, a transparent screen disposed in said opening, scales marked off on said screen, a light-sensitive chart disposed on one side of said screen, wet and dry bulb thermometers corresponding to the calibrations of the respective scales disposed on the opposite side of said screen, a lamp associated with each thermometer and disposed at an angle of approximately 22½° with said partition, a shield surrounding each lamp and projecting in toward the respective thermometers, and automatic means for periodically illuminating said thermometer and moving said chart, whereby a series of images is formed on said chart of said scales and the portions of the indicating columns of the thermometers above the liquid.

11. In a device for recording temperature, a light tight chamber, a partition dividing said chamber, an opening in said partition, a transparent screen disposed in said opening, a scale marked off on said screen, a light-sensitive chart disposed on one side of said partition, a thermometer corresponding to the calibration of said scale disposed on the opposite side of said partition, a shielding tube surrounding said thermometer and disposed adjacent said partition, an opening of width equal to that of the thermometer bore disposed in said tube adjacent said chart, a second opening in said tube for the admission of light rays, a source of light disposed at an angle of approximately 22½° with said partition, and a shield surrounding said source of light and projecting in toward the thermometer, whereby an image is formed on said chart of said scale and the portion of the indicating column of the thermometer above the liquid.

In witness whereof, I hereunto subscribe my name this 30th day of June, A. D., 1921.

DAVID T. MAY.